(12) United States Patent
Hayakawa

(10) Patent No.: US 9,413,914 B2
(45) Date of Patent: Aug. 9, 2016

(54) IMAGE READING CONTROL APPARATUS, IMAGE READING APPARATUS, AND IMAGE READING CONTROL METHOD

(71) Applicant: CANON KABUSHIKI KAISHA, Tokyo (JP)

(72) Inventor: Mizuki Hayakawa, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 6 days.

(21) Appl. No.: 14/546,882

(22) Filed: Nov. 18, 2014

(65) Prior Publication Data

US 2015/0156359 A1 Jun. 4, 2015

(30) Foreign Application Priority Data

Dec. 2, 2013 (JP) ................................. 2013-249624

(51) Int. Cl.
*H04N 1/04* (2006.01)
*H04N 1/00* (2006.01)
*H04N 1/10* (2006.01)

(52) U.S. Cl.
CPC ....... *H04N 1/00811* (2013.01); *H04N 1/00809* (2013.01); *H04N 1/10* (2013.01)

(58) Field of Classification Search
CPC .............................................. H04N 1/00809
USPC ......... 358/486, 443, 448, 488, 453, 462, 464, 358/497, 465; 382/282, 286
See application file for complete search history.

(56) References Cited

U.S. PATENT DOCUMENTS

| | | | | |
|---|---|---|---|---|
| 6,535,306 B1 * | 3/2003 | Kiuchi | ............... | H04N 1/00795 358/406 |
| 6,603,572 B1 * | 8/2003 | Nakatani | ............... | H04N 1/0405 358/1.12 |
| 2010/0142012 A1 * | 6/2010 | Yamamoto | ........... | G06K 9/3275 358/498 |
| 2014/0185904 A1 * | 7/2014 | Yonezawa | ..................... | 382/133 |

FOREIGN PATENT DOCUMENTS

| | | |
|---|---|---|
| JP | 2000-003112 | 1/2000 |
| JP | 2003-046731 | 2/2003 |
| JP | 2012222791 A * | 11/2012 |

\* cited by examiner

*Primary Examiner* — Cheukfan Lee
(74) *Attorney, Agent, or Firm* — Fitzpatrick, Cella, Harper & Scinto

(57) ABSTRACT

In an image reading apparatus which allows a user to specify an original size and orientation and reads the specified area, the orientation of a placed original and the specified original orientation are often different. If a wrong original orientation is specified, the original is cut halfway, and a scanning result intended by the user cannot be obtained. In an embodiment of this invention, therefore, the user is allowed to specify only an original size, and an area necessary for orientation determination is read from the specified original size. After that, the original orientation is detected from the area, and the image is cut out and output.

18 Claims, 12 Drawing Sheets

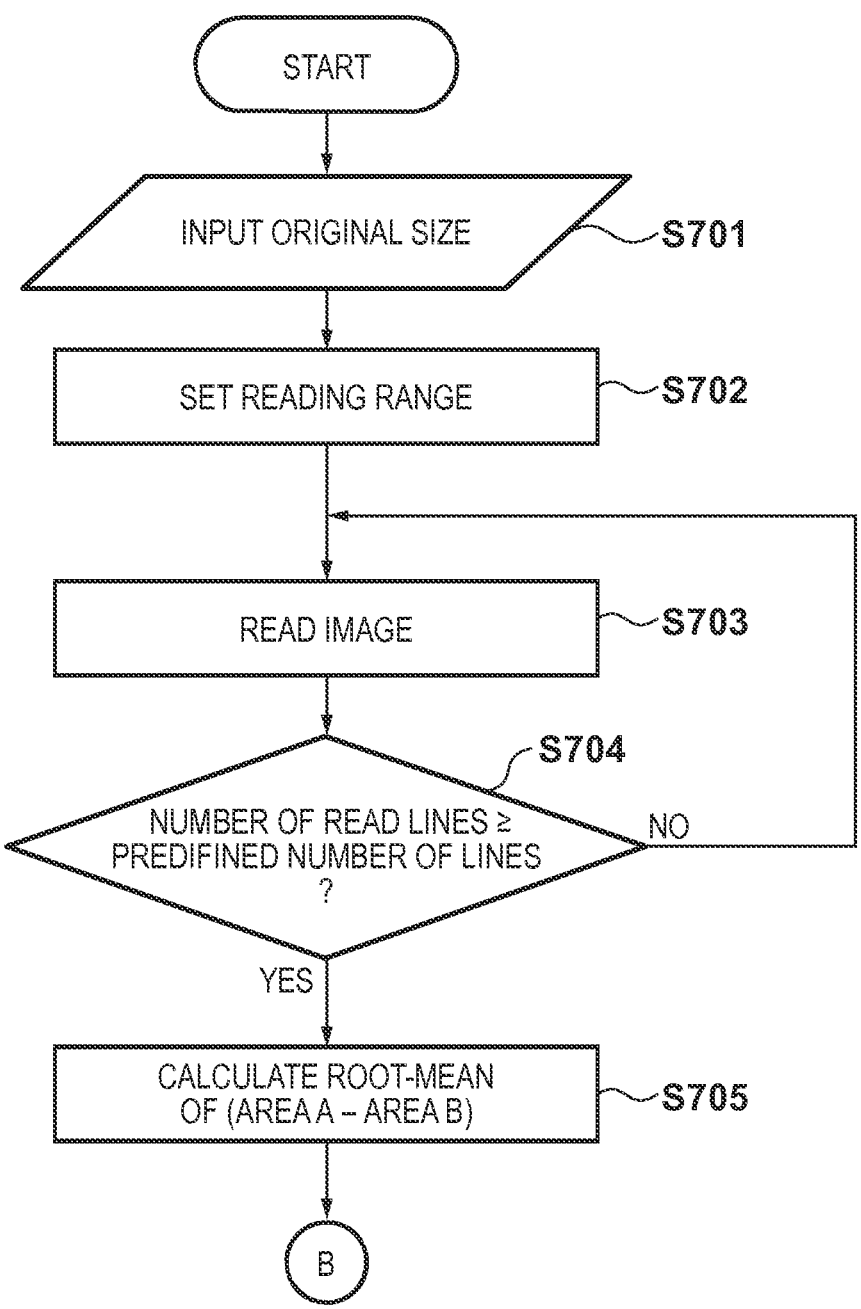

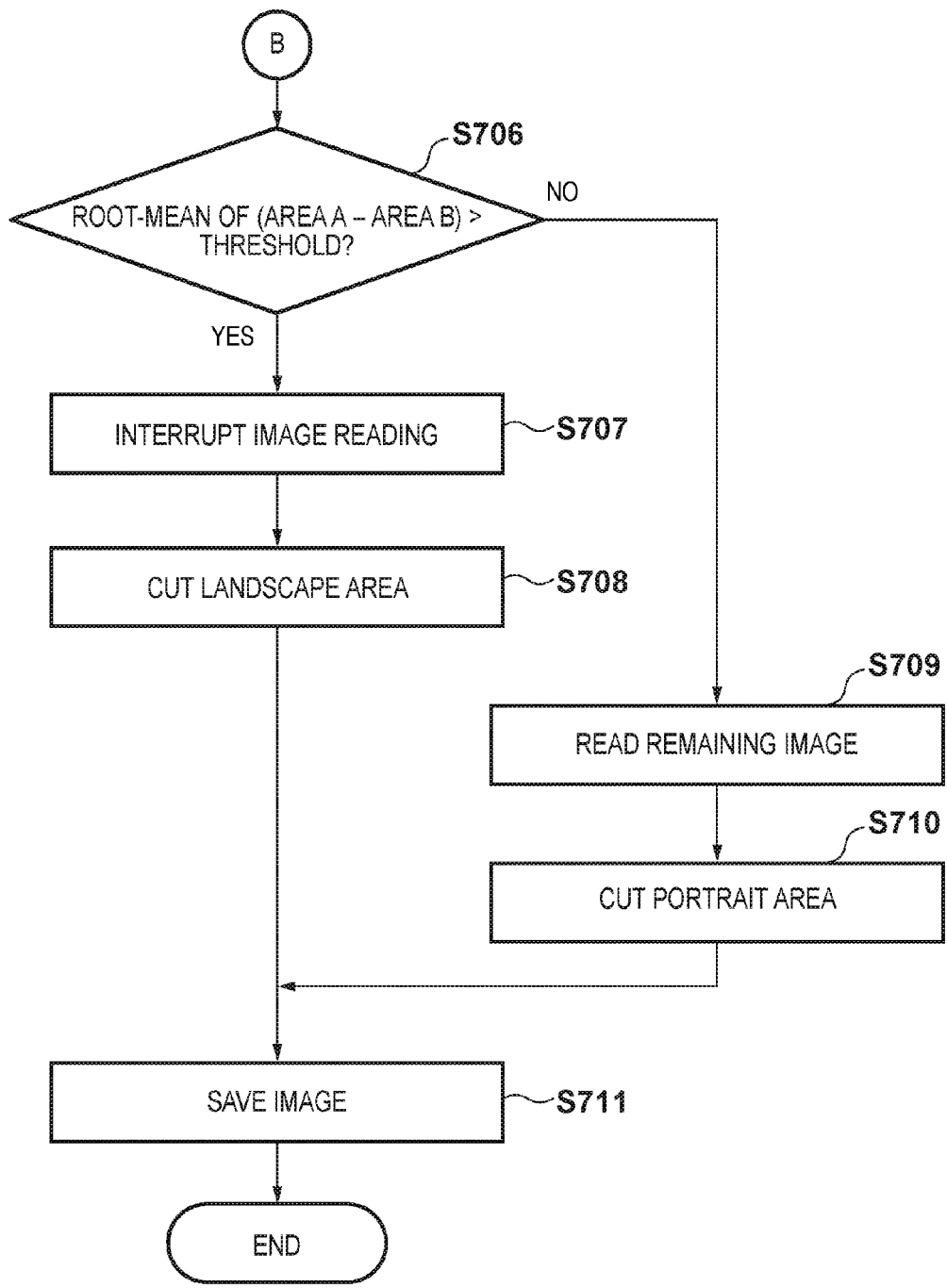

IMAGE READING CONTROL APPARATUS, IMAGE READING APPARATUS, AND IMAGE READING CONTROL METHOD

BACKGROUND OF THE INVENTION

1. Field of the Invention

The present invention relates to an image reading control apparatus, image reading apparatus, and image reading control method, and particularly to, for example, an image reading control apparatus, image reading apparatus, and image reading control method for optically controlling reading of an image original placed on an original platen glass.

2. Description of the Related Art

Conventionally, the following methods have been used as a method for detecting an original area placed on an image reading apparatus. The first method is a method in which a photosensor is arranged below an original platen glass, and a placed original is sensed by the photosensor, thereby sensing and reading the original size (Japanese Patent Laid-Open No. 2000-003112). This method has the advantage that no unnecessary reading process occurs because the original size can be sensed before original reading.

The second method is a method for reading the whole surface of an original platen, and sensing and cutting out an original area from the read image (Japanese Patent Laid-Open No. 2003-46731). This method has the advantage that a cost for adding hardware such as a photosensor is unnecessary. The third method is a method by which a user is made to specify the size and orientation of an original placed on an original platen, and the specified range is read. This method has the advantages that a cost for adding hardware such as a photosensor is unnecessary, and no useless reading area is generated because a reading area can be determined beforehand.

Unfortunately, the first method increases the hardware cost because the photosensor is added. The second method does not require any cost for adding hardware such as a photosensor. However, sensing is performed after the whole original area is read. When a small original is placed, therefore, an unnecessary reading area is generated, and this often prolongs the processing time.

In the third method, a user is made to specify the original size and orientation, and this is time-consuming. In addition, the possibility that the user specifies a wrong original size is low, but the user readily misunderstands the original orientation. If the use has specified a wrong original orientation, an image not desired by the user is read and saved.

SUMMARY OF THE INVENTION

Accordingly, the present invention is conceived as a response to the above-described disadvantages of the conventional art.

For example, an image reading control apparatus, image reading apparatus, and image reading control method according to this invention are capable of correctly reading an original at a high speed by an inexpensive easy operation.

According to one aspect of the present invention, there is provided an image reading control apparatus which causes an image sensor to read an image from an original placed on an original platen. The image reading control apparatus comprises: an input unit configured to input a size of the original; a setting unit configured to set a reading range of the image sensor based on the size input by the input unit; a control unit configured to control the image sensor to read an original in the reading range set by the setting unit; and a comparison unit configured to compare characteristics of images in a plurality of areas in a reading area obtained by the reading, wherein the control unit controls the image sensor to interrupt reading of the reading range set by the setting unit in accordance with a comparison result obtained by the comparison unit.

According to another aspect of the present invention, there is provided an image reading apparatus. The image reading apparatus comprises: the above-described image reading control apparatus; an original platen; the image sensor; a moving unit configured to move the image sensor in a predetermined direction; and an operation panel configured to operate reading from the original.

According to still another aspect of the present invention, there is provided a non-transitory computer readable storage which stores a computer program to be executed in an image reading control apparatus which is capable of controlling image reading from an original placed on an original platen by an image sensor. The computer program comprises: a code which executes an input process of inputting a size of the original; a code which executes a setting process of setting a reading range of the image sensor based on the size input by the input process; a code which executes a control process of controlling the image sensor to read an original in the reading range set by the setting process; and a code which executes a comparison process of comparing characteristics of images in a plurality of areas in a reading area obtained by the reading, wherein the control process controls the image sensor to interrupt reading of the reading range set by the setting process in accordance with a comparison result obtained in the comparison process.

According to still another aspect of the present invention, there is provided an image reading control method of an image reading control apparatus which controls an image sensor to read an image from an original placed on an original platen. The method comprises: inputting a size of the original; setting a reading range of the image sensor based on the input size; controlling the image sensor to read an original in the set reading range; and comparing characteristics of images in a plurality of areas in a reading area obtained by the reading, wherein the controlling comprises controlling the image sensor to interrupt reading of the set reading range in accordance with the comparison result.

The invention is particularly advantageous since it is possible to set a reading range based on an original size specified by a user, determine the orientation in which the original is placed from an image read in the set range, and determine whether to perform reading. Accordingly, it is possible to reduce unnecessary reading, and read an image faster. Also, an original can be read without specifying the orientation of the original. This makes it possible to prevent an input error by a user, and correctly read an image by an easy operation.

Furthermore, it is possible to inexpensively, rapidly, and correctly read an original because no special apparatus configuration is necessary.

Further features of the present invention will become apparent from the following description of exemplary embodiments (with reference to the attached drawings).

BRIEF DESCRIPTION OF THE DRAWINGS

FIGS. 8 and 9 are flowcharts showing an image original orientation detection process and image reading process according to the first embodiment.

DESCRIPTION OF THE EMBODIMENTS

Exemplary embodiments of the present invention will now be described in detail in accordance with the accompanying drawings.

In this specification, the terms "print" and "printing" not only include the formation of significant information such as characters and graphics, but also broadly includes the formation of images, figures, patterns, and the like on a print medium, or the processing of the medium, regardless of whether they are significant or insignificant and whether they are so visualized as to be visually perceivable by humans.

Also, the term "print medium" not only includes a paper sheet used in common printing apparatuses, but also broadly includes materials, such as cloth, a plastic film, a metal plate, glass, ceramics, wood, and leather, capable of accepting ink.

Furthermore, the term "ink" (to be also referred to as a "liquid" hereinafter) should be extensively interpreted similar to the definition of "print" described above. That is, "ink" includes a liquid which, when applied onto a print medium, can form images, figures, patterns, and the like, can process the print medium, and can process ink. The process of ink includes, for example, solidifying or insolubilizing a coloring agent contained in ink applied to the print medium.

In addition, "a printing element" or "a printing device" is a general term for a nozzle, a channel communicating with the nozzle, and a device for generating energy to be used to discharge ink, unless otherwise specified.

Figure 1:
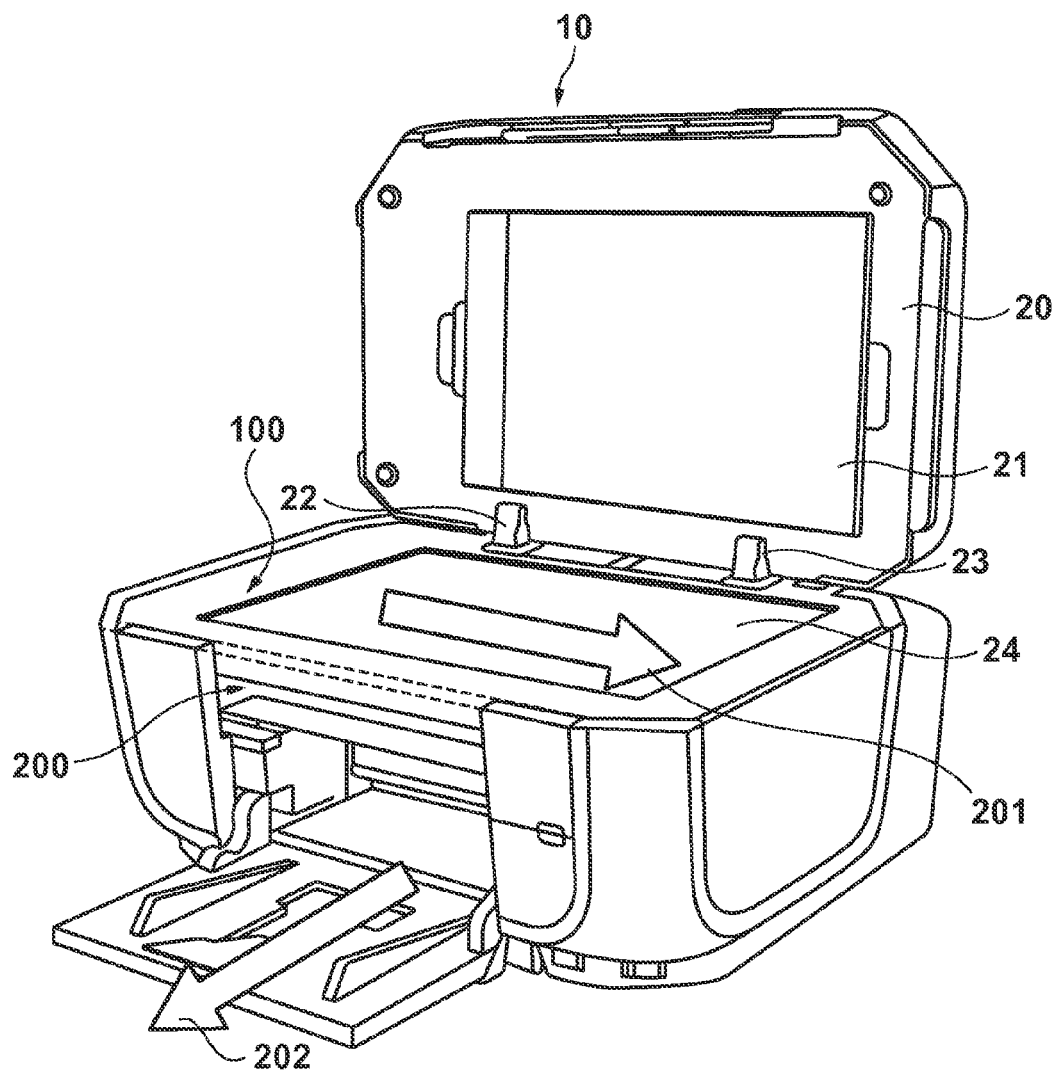
FIG. 1 is a perspective exterior view showing an outline of the arrangement of a multi-function printer apparatus (MFP apparatus) as an exemplary example of the present invention.

FIG. 1 is a perspective exterior view showing an outline of the arrangement of a multi-function printer (to be referred to as an MFP apparatus hereinafter) as an exemplary example of the present invention. An MFP apparatus 10 includes an image reader 100 and image printer 200, and can read an image original placed on an original platen glass 24, print the image on a print medium such as a printing sheet, and transfer image data obtained by the reading to a host apparatus connected to the MFP apparatus 10. The MFP apparatus 10 can also print an image on a print medium based on image data transferred from the host apparatus. The MFP apparatus 10 includes an original cover 20 which rotates around two hinges 22 and 23 and can cover the original platen glass 24 when reading an image original. In addition, a white press platen 21 is formed on the lower surface of the original cover 20 and can press an original.

Note that the image reader 100 reads an image original in a direction indicated by an arrow 201, while the image printer 200 outputs a print medium on which an image is printed in a direction indicated by an arrow 202. For example, an A4 portrait original is read as it is placed on the original platen glass 24 such that the direction of the arrow 201 is the portrait direction. When printing an image on an A4 portrait sheet, the image is printed such that the direction of the arrow 202 is the portrait direction of the sheet, and the printed sheet is discharged. Since the direction of an original to be read and the direction of a printing sheet are thus perpendicular to each other, the original orientation specified by the image printer 200 and that specified by the image reader 100 become different, and this confuses the user.

In this embodiment, the image printer 200 uses a printhead (not shown) complying with an inkjet printing method, and prints an image by discharging ink from the printhead. However, it is also possible to use a printer adopting another printing method such as an electrophotographic method, thermal transfer method, or sublimation method.

Figure 2:
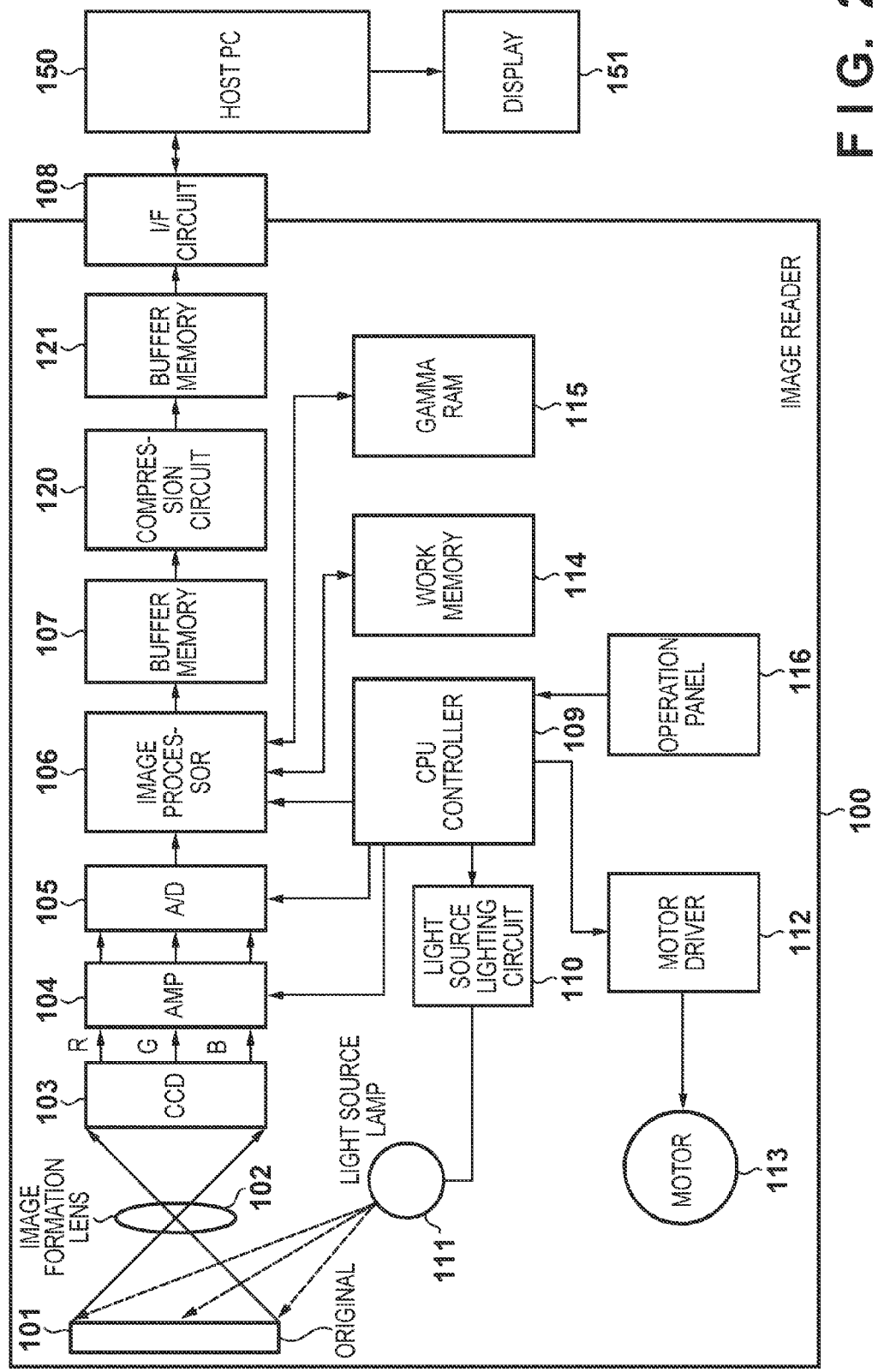
FIG. 2 is a block diagram showing details of the arrangement of an image reader of the MFP apparatus shown in FIG. 1.

FIG. 2 is a view showing the internal arrangement of the image reader and the connection relationship with the host apparatus.

As shown in FIG. 2, the image reader 100 illuminates an original 101 with a light source lamp 111 controlled by a light source lighting circuit 110, and forms an image of reflected light having intensity corresponding to the density on the original surface on a line image sensor 103 such as a CCD (Charge-Coupled Device) through an image formation lens 102. Then, an amplifier (AMP) 104 amplifies an analog image signal output from the line image sensor 103. On the other hand, a motor driver 112 outputs an excitation signal in accordance with a control signal from a CPU controller 109, thereby driving an optical system driving motor 113 such as a stepping motor, and moving the line image sensor in the direction of the arrow 201.

In the line image sensor 103, a sensor array is formed by arranging a plurality of image capturing elements in a direction perpendicular to the arrow 201, and image reading is performed line by line by electrically scanning this sensor array. In image reading, therefore, the direction in which the plurality of image capturing elements are arranged is called a main scanning direction, and the direction in which the line image sensor moves is called a sub scanning direction.

An A/D converter 105 converts an analog image signal output from the amplifier 104 into a digital image signal, and outputs the digital image signal to an image processor 106. The image processor 106 performs image processing such as offset correction, shading correction, digital gain adjustment, color balance adjustment, color masking conversion, and resolution conversion in the main and sub scanning directions on the digital image signal. A buffer memory 107 formed by a RAM temporarily stores data having undergone the image processing, and a compression circuit 120 compresses the image data stored in the buffer memory 107. A buffer memory 121 formed by a RAM temporarily stores the compressed data. The compressed image data is output to the host apparatus (a host PC 150) from an interface (I/F) circuit 108 such as a SCSI, parallel, USB, IEEE1394, LAN, or wireless LAN interface. It is also possible to directly transfer this image data to the above-described image printer 200, and perform image printing. Note that commands and the like are also communicated with the host apparatus via the interface circuit 108.

When performing image processing, the image processor 106 uses a work memory 114 as a temporary work area. The work memory 114 is used to, for example, correct an RGB line offset of image signals from RGB line sensors arranged parallel with a predetermined offset on the line image sensor 103. In addition, the work memory 114 temporarily stores various kinds of data such as shading correction. The image processor 106 also uses a density-gamma conversion LUT stored in a gamma RAM 115 in order to perform gamma correction.

The CPU controller 109 executes the operations and control as described above in accordance with instructions from the host PC 150.

Also, the CPU controller 109 detects a state in which a switch of an operation panel 116 is pressed, and notifies the host PC 150 of this state via the interface circuit 108. The host PC 150 is connected to a display 151.

Note that the line image sensor 103 includes a 3-line CCD sensor for reading an image by RGB color components, and the light source lamp 111 as a white light source. However, the same function can be implemented even in an arrangement including a monochromatic 1-line image sensor and an RGB 3-color light sources which can selectively be turned on. Although not shown, it is also possible to use three-color LEDs as light sources, turn on one of the three-color light source LEDs by the CPU controller 109 by using the light source lighting circuit 110, and read the emitted illumination light by the image sensor. In this arrangement, an image original is read by sequentially switching LEDs to be turned on, thereby performing color decomposition in accordance with the color emitted by the light source, and reading the original image.

Figure 3:
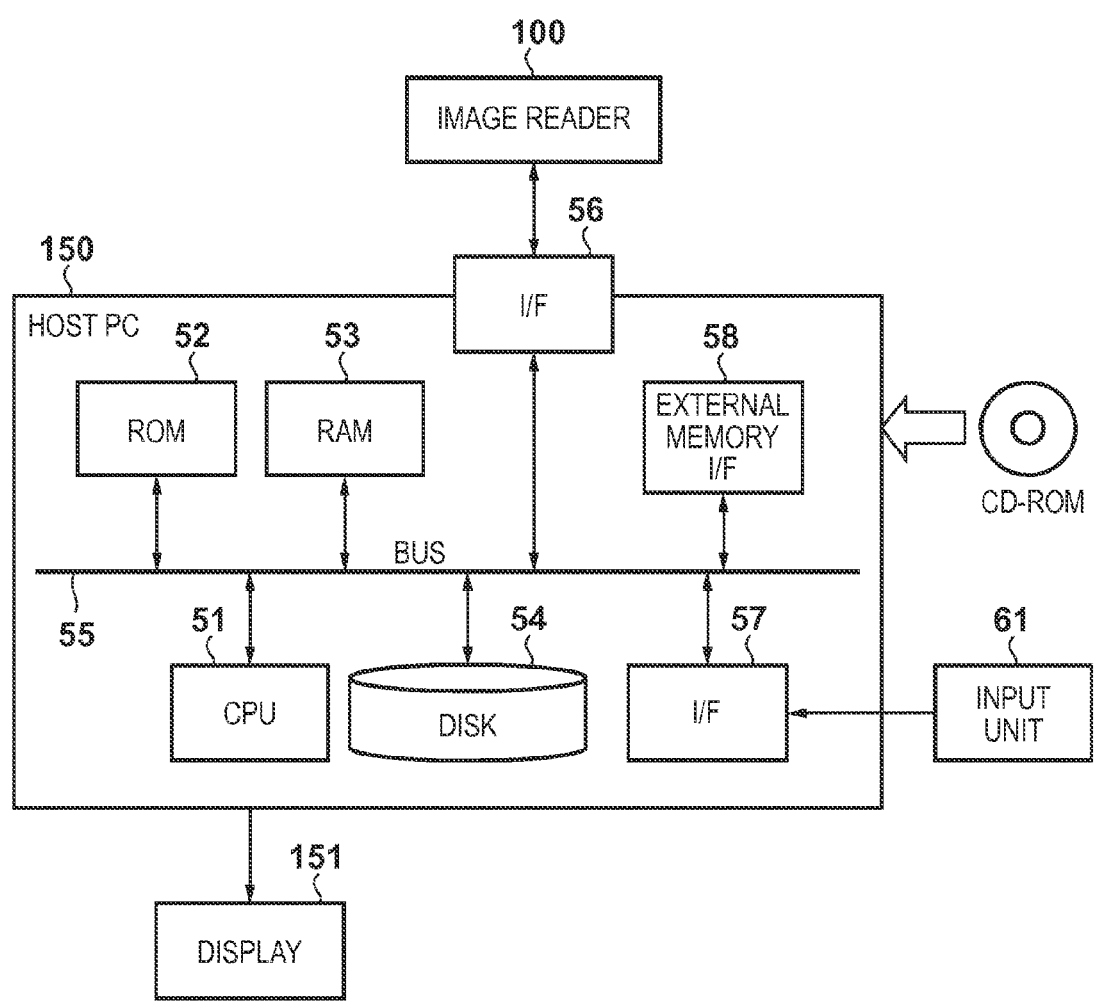
FIG. 3 is a block diagram showing details of the arrangement of a host PC to which the MFP apparatus shown in FIG. 1 is connected.

FIG. 3 is a block diagram showing an outline of the arrangement of the host apparatus which controls the image reader 100.

The host PC 150 as the host apparatus includes a CPU 51, a ROM 52, a RAM 53, a disk 54, interfaces (I/Fs) 56 and 57, and an external memory I/F 58. These constituent elements are interconnected by a bus 55, and exchange data with each other. The ROM 52 is holding a program which implements the operation (to be described later) of a flowchart shown in FIG. 6. The RAM 53 provides a memory area and work area necessary for the program operation. The CPU 51 performs processing in accordance with the program held in the ROM 52.

The host PC 150 is connected to the image reader 100 described above via the I/F 56, and performs data communication. The I/F 56 has an interface based on the same standard as that of the interface (I/F) circuit 108 of the image reader 100, and it is possible to adopt various interfaces such as the USB interface and IEEE1394. The host PC 150 is connected to an input unit 61 such as a pointing device or keyboard by the interface (I/F) 57.

Also, the host PC 150 is connected to a device for driving an external memory medium such as a DVD-ROM or CD-ROM by the external memory interface (I/F) 58. Accordingly, it is also possible to read out a program stored in an external memory medium such as a CD-ROM, and download the program via the external memory I/F 58, instead of holding the control program in the ROM 52 beforehand. Note that the control program may also be downloaded across a network via a network connector (not shown).

Figure 4:
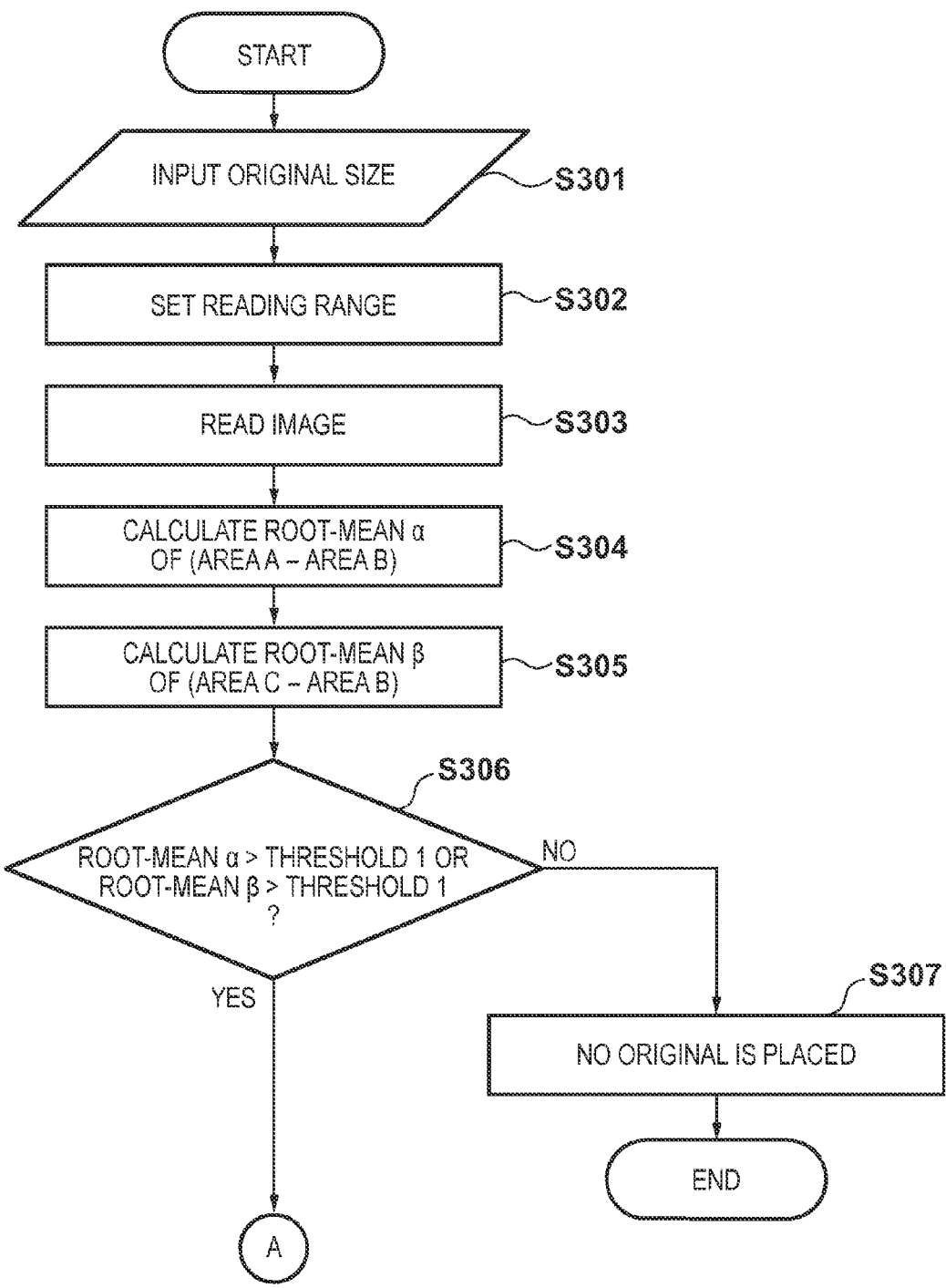
FIGS. 4 and 5 are flowcharts showing an original image orientation detection process and image reading process as a comparative example.
Figure 5:
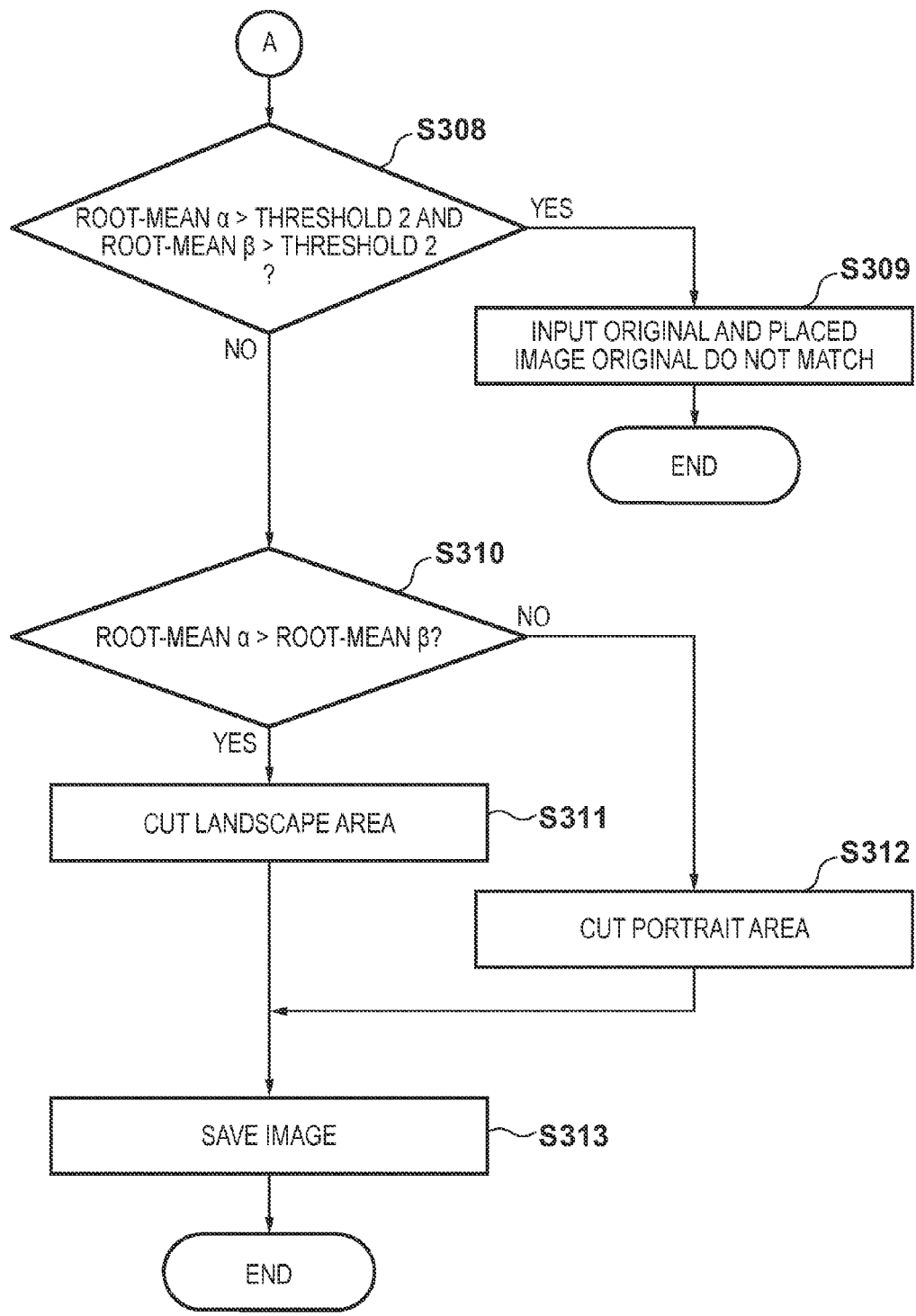

FIGS. 4 and 5 are flowcharts showing a scanner driver program (comparative example) which causes the image reader 100 to perform image reading specified by the host PC 150.

Figure 6:
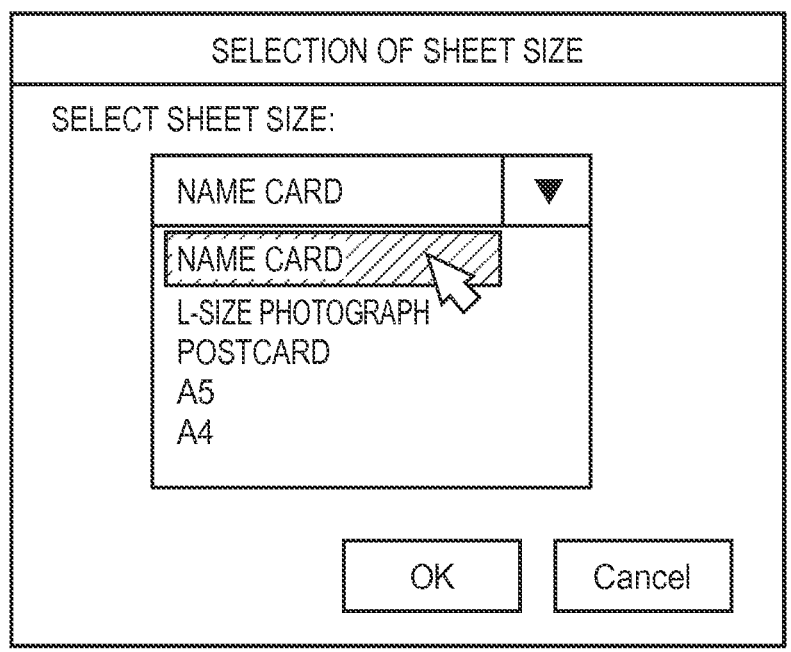
FIG. 6 is a view showing a UI screen on which a user specifies the size of an image original.

FIG. 6 is a view showing the display screen of a user interface (UI) implemented on the operation panel 116 of the image reader 100 or on the display 151 connected to the host PC 150 by executing the control program.

In step S301, the size of an original placed on the original platen is input by the user. For example, the user is prompted to select a sheet size by using the UI as shown in FIG. 6. In step S302, the reading range of the original is obtained from the original size specified by the user. The width of this reading range is the long side of the original size selected by the user, and the length of the reading range is also the long side of the original size, that is, the reading range is a long side×long side area. When an L-size photograph is specified, for example, the reading range is 127 mm×127 mm based on 127 mm×89 mm as the dimensions of L size.

In step S303, the original area obtained in step S302 is read from an original abutting portion of the original platen glass. This step is terminated after the set original size is completely read. Note that in order to read an image from the reading start position, the user must abut the original against the abutting portion before reading.

Figure 7A:
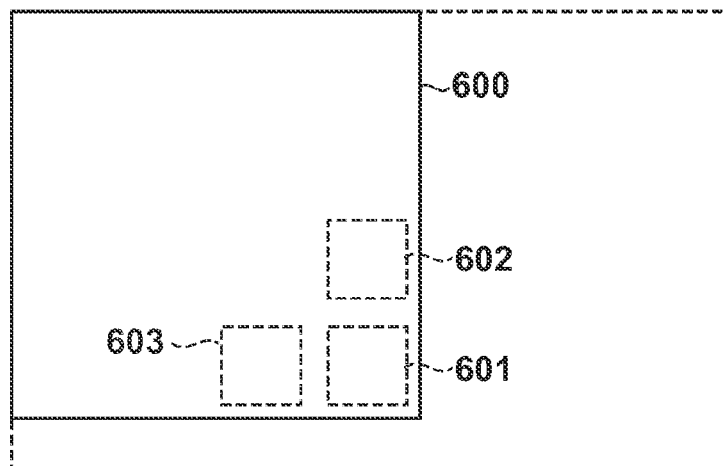
FIGS. 7A, 7B, and 7C are schematic views for explaining the image original orientation detection process.
Figure 7B:
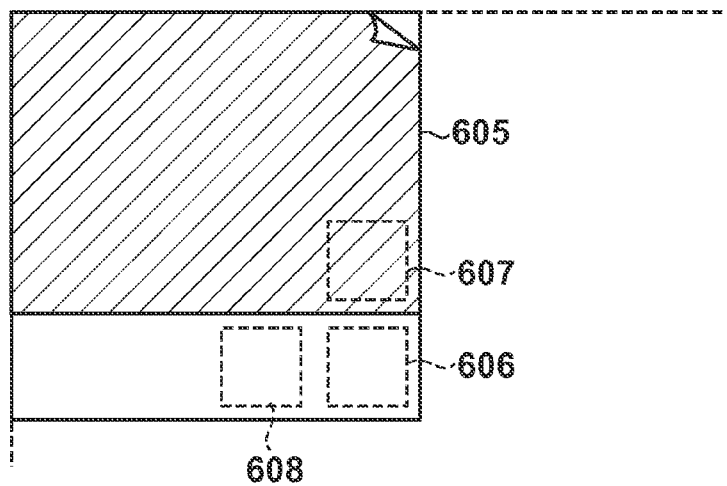
Figure 7C:
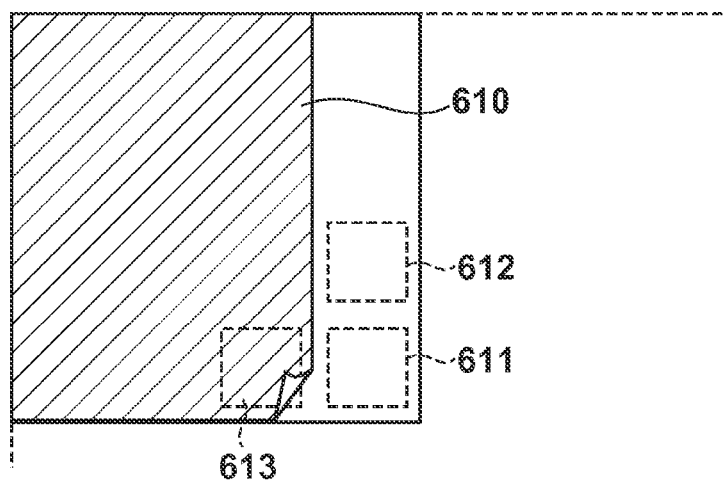

FIGS. 7A to 7C are views showing images obtained by original reading.

Referring to FIGS. 7A to 7C, the upper left corner of an image 600 indicates the abutting portion of the original platen glass, and the user places an original by abutting it against the abutting portion.

In step S304, a root-mean $\alpha$ of the differences between areas 601 and 602 shown in FIG. 7A of the read image is obtained. The length of one side of each of the areas 601 and 602 is 25.4 mm, and 300 pixels are arranged on one side in a case where the resolution of the image read in step S303 is 300 dpi. Accordingly, each of the areas 601 and 602 contains 90,000 pixels. From the pixels in these areas, a pixel is extracted from the upper left corner of each area, and the brightness difference between pixels in corresponding positions is obtained and squared. Pixels to the right of the extracted pixels are sequentially extracted, and the same calculation is performed. When a pixel at the right end is reached by repeating this operation, the extraction position is returned to the left end of the area, and the same calculation is performed on pixels on every line below the first line. In this way, when a pixel at the lower right corner is extracted and the calculation is completed, the squares of the differences between pixels in the 90,000 corresponding positions are obtained. The mean of the squares of the 90,000 differences is calculated as the root-mean $\alpha$ of the differences between the areas 601 and 602.

In step S305, a root-mean $\beta$ of the differences between the area 601 and an area 603 shown in FIG. 7A is obtained. The method of obtaining this root-mean is the same as that in step S304. Note that the root-mean of the differences between two areas is obtained in each of steps S304 and S305, but it is also possible to use a calculation method of comparing the characteristics of two images, for example, the mean, correlation, or covariance of the absolute values of differences.

In step S306, whether the root-mean $\alpha$ obtained in step S304 and the root-mean $\beta$ obtained in step S305 are larger than threshold 1 is checked. In a case where a reading operation is executed without placing any original on the original platen glass, the press platen 21 for pressing an original is read. Since the surface of the press platen 21 is generally white and has a uniform brightness distribution, the root-mean value of the differences between two areas is small. Therefore, whether an original is placed on the original platen glass is checked by comparing the root-means $\alpha$ and $\beta$ with threshold 1 which has been obtained in advance from values obtained by reading only the surface of the press platen 21. If it is determined by this comparison that no original is placed, the process advances to step S307. If it is determined that an original is placed, the process advances to step S308.

In step S307, processing for a case in which no original is placed is performed. For example, a message for notifying the user that no original is placed is displayed, or an original is cut out by the user's specified size and output, by determining that the original is placed in a predetermined orientation.

On the other hand, in step S308, whether the root-mean $\alpha$ obtained in step S304 and the root-mean $\beta$ obtained in step S305 are larger than threshold 2 is checked.

In a case where an original larger than the original size specified by the user in step S301 is placed on the original platen glass, the root-mean value of the differences between two areas is larger than that obtained by reading only the press platen surface, due to the influence of, for example, a photograph and characters printed on the original and the paper quality. Whether an original larger than the original size specified by the user is placed on the original platen glass is checked by comparing the root-means $\alpha$ and $\beta$ with threshold 2 which has been obtained in advance from values obtained by reading only the press platen surface. If it is determined by this comparison that a large original is placed, the process advances to step S309.

In step S309, processing for a case in which an original larger than the specified size is placed is executed. For example, the user is prompted to input the original size again, or the original is cut out by the user's specified size and output, by determining that the original is placed in a predetermined orientation.

On the other hand, if it is determined that an original lager than the original size specified by the user is not placed on the original platen glass, the process advances to step S310, and the values obtained in steps S304 and S305 are compared. If the comparison result is $\alpha>\beta$, the process advances to step S311. If the comparison result is $\alpha\leq\beta$, the process advances to step S312.

In step S311, it is determined from the image (the image in the reading range) read in step S303 that the user has placed the original in a landscape direction, and the image is cut out. Provided that an L-size photograph is placed, for example, an image having a width of 127 mm and a height of 89 mm is cut out.

FIG. 7B schematically shows a case in which the user has placed an original 605 in the landscape direction. Referring to FIG. 7B, the original image 605 is placed by the user, and areas 606 and 608 are areas in which no original is placed, so images corresponding to these areas 606 and 608 are obtained by reading the surface of the press platen for pressing an original. Accordingly, the images in the areas 606 and 608 are similar, and the root-mean of the differences is close to 0. On the other hand, an area 607 is a portion of the image of the original placed by the user, and the root-mean of the differences between the areas 606 and 607 is equal to or larger than a predetermined value and larger than at least the value obtained from the areas 606 and 608. This makes it possible to determine that the user has placed the original in the landscape direction.

In step S312, it is determined from the image (the image in the reading range) read in step S303 that the user has placed the original in the portrait direction, and the image is so cut out. Provided that an L-size photograph is placed, for example, an image having a width of 89 mm and a height of 127 mm is cut out.

FIG. 7C schematically shows a case in which the user has placed an original 610 in the portrait direction. As a case where an original is placed in the landscape direction, the root-mean of the differences between areas 611 and 613 is larger than that of the differences between the area 611 and an area 612. Accordingly, it is possible to determine that the user has placed the original in the landscape direction.

In step S313, the images cut out in steps S311 and S312 are saved, and the process is terminated.

The above-described operation makes it possible to cut out an image original based on the original size specified by the user and save the cutout image.

Next, several embodiments obtained by further improving the process of the above-mentioned comparative example will be explained.

[First Embodiment]

FIGS. 8 and 9 are flowcharts of a scanner driver program for causing the image reader 100 to perform image reading specified by the host PC 150 in accordance with the first embodiment.

In step S701, the size of an original placed on the original platen is input by the user. Since the input method is the same as that in the comparative example, an explanation thereof will be omitted.

In step S702, from the original size specified by the user, the reading width is obtained as short side+(long side−short side)×2, and the reading length is obtained as the long side. Provided that an L-size photograph is specified, for example, the reading range width is obtained as 89+(127−89) ×2=165 mm, and the reading length is obtained as 127 mm, based on 127 mm×89 mm as the dimensions of L size. Also, in step S704, a prescribed line for use in determination is obtained as 89 mm (the short side of the original size to be read).

In step S703, the original area obtained in step S702 is read, starting from the abutting portion of the original platen glass. In the comparative example, after the set original size is completely read in this step, the process advances to the next step. In this embodiment, however, the image is successively read, and the process advances to the next step after lines to be transferred at one time are read.

In step S704, whether the total number of lines read in step S703 has exceeded the predefined line is determined. The predefined line is obtained as 89 mm in step S702. If this determination is true, therefore, the read data represents an image having a width of 165 mm and a height of 89 mm, and the remaining reading length is 38 mm.

Figure 10A:
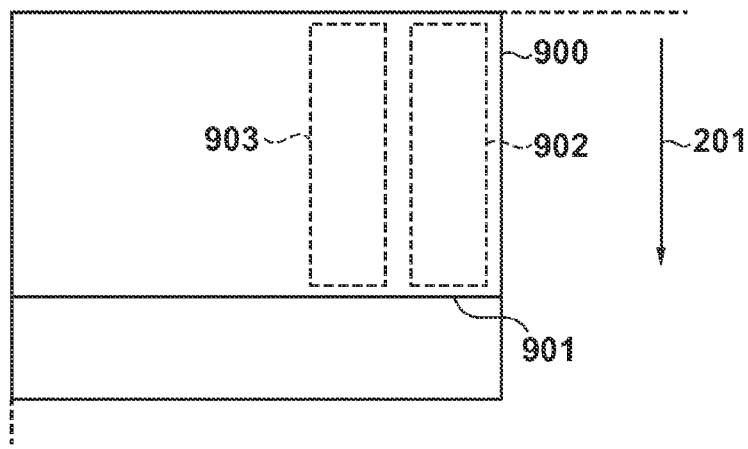
FIGS. 10A, 10B, and 10C are schematic views for explaining the image original orientation detection process according to the first embodiment.
Figure 10B:
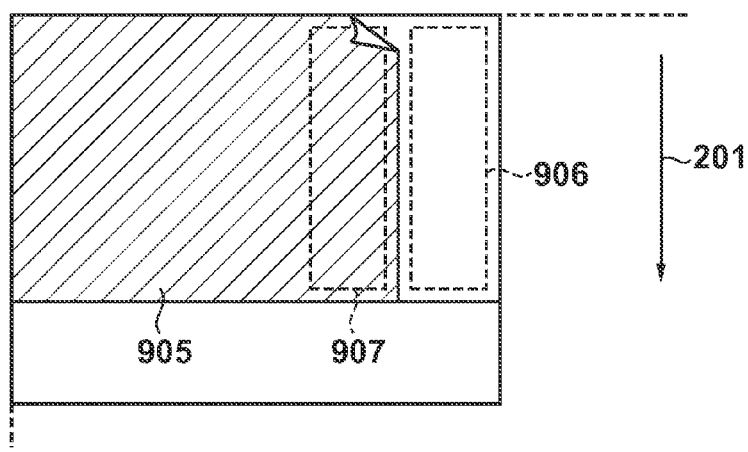
Figure 10C:
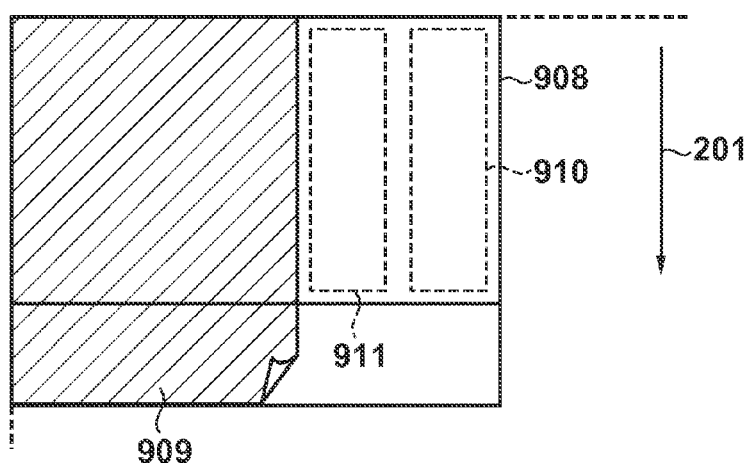

FIGS. 10A to 10C are views showing images obtained by image original reading. Note that in FIGS. 10A to 10C, an arrow 201 is the same as the arrow shown in FIG. 1, and indicates the moving direction of the image line sensor 103 during image original reading.

FIG. 10A shows reading to a predefined line 901 in a reading range 900. Note that the upper left corner of the reading range 900 is the abutting portion of the original platen glass, and the user places an image original by abutting it against the abutting portion.

In step S705, the root-mean of the differences between areas 902 and 903 shown in FIG. 10A of the read image is obtained. The short side of each of the areas 902 and 903 is 12.7 mm, and the long side of each area is 101.6 mm. In a case where the reading resolution in step S703 is 300 dpi, therefore, 150 pixels are arranged on the short side, and 1,200 pixels are arranged on the long side. Accordingly, each of the areas 902 and 903 contains 180,000 pixels. From the pixels contained in the areas 902 and 903, pixels are extracted to the right from the upper left corner, and the brightness difference between pixels in corresponding positions is obtained and squared. In addition, a pixel to the right of each extracted pixel is extracted, and the same calculation is performed. When a pixel at the right end is reached by repeating this operation, the extraction position is returned to the left end of the area, and the same calculation is performed on pixels on every line below the first line. In this way, when a pixel at the lower right corner is extracted and the calculation is completed, the squares of the differences between the total of 180,000 pixels are obtained. The mean of the squares of the 180,000 differences are calculated as a root-mean α of the differences between the areas 902 and 903.

Note that the root-mean of the differences between two areas is obtained in step S705, but it is also possible to use a calculation method of comparing the characteristics of two images, for example, the mean, correlation, or covariance of the absolute values of differences.

In step S706, whether the root-mean obtained in step S705 is larger than a threshold is checked. As shown in FIG. 10B, when the user has placed an original 905 in the landscape direction, an area 906 is an area of the press platen 21, and an area 907 is an area of the original 905. In a case where the root-mean of the differences between these two areas is obtained, the value is large because the areas are not similar. On the other hand, when the user has placed an original 909 in the portrait direction as shown in FIG. 10C, both areas 910 and 911 are press platen areas. In a case where the root-mean of the differences between these two areas is obtained, the value is small because the brightness distributions obtained from the areas are similar.

A threshold is obtained in advance from the root-mean of the differences between these two areas of the press platen 21, and used as a determination condition in this step. If the obtained root-mean is larger than the threshold, it is determined that the user has placed the original in the landscape direction, and the process advances to step S707. On the other hand, if the root-mean is equal to or smaller than the threshold, it is determined that the original is placed in the portrait direction, and the process advances to step S709.

In step S707, image reading is interrupted at this point of time because it is determined that the original is placed in the landscape direction. Then, in step S708, the landscape-direction specified size is cut out from the image read in step S703. On the other hand, in step S709, an unread area is read because it is determined that the original is placed in the portrait direction. Then, the reading area obtained in step S702 is read, and the process advances to step S710. In step S710, the portrait-direction specified size is cut out from the images read in steps S703 and S709. Finally, in step S711, image data of the image cut in step S708 or S710 is saved, and the process is terminated.

In the embodiment explained above, therefore, upon cutting out and saving an original based on the original size specified by the user, it is possible to terminate image reading at the time of the completion of reading a necessary area if the user has placed the original in the landscape direction. This makes it possible to terminate reading within a time period almost equal to that necessary for performing reading by specifying the orientation and original size by the user.

Note that in the embodiment explained above, as shown in FIGS. 10A and 10B, the line image sensor 103 reads a length equivalent to the size of an original in the portrait direction in a case where the original is placed in the landscape direction. However, the present invention is not limited to this. If no high-accuracy determination is required, the reading length of the line image sensor 103 may also be set shorter than the size of an original in the portrait direction in a case where the original is placed in the landscape direction. As far as it is possible to grasp the overall tendency even by reading a short distance as described above, it is sufficiently possible to determine the original orientation.

[Second Embodiment]

Figure 11:
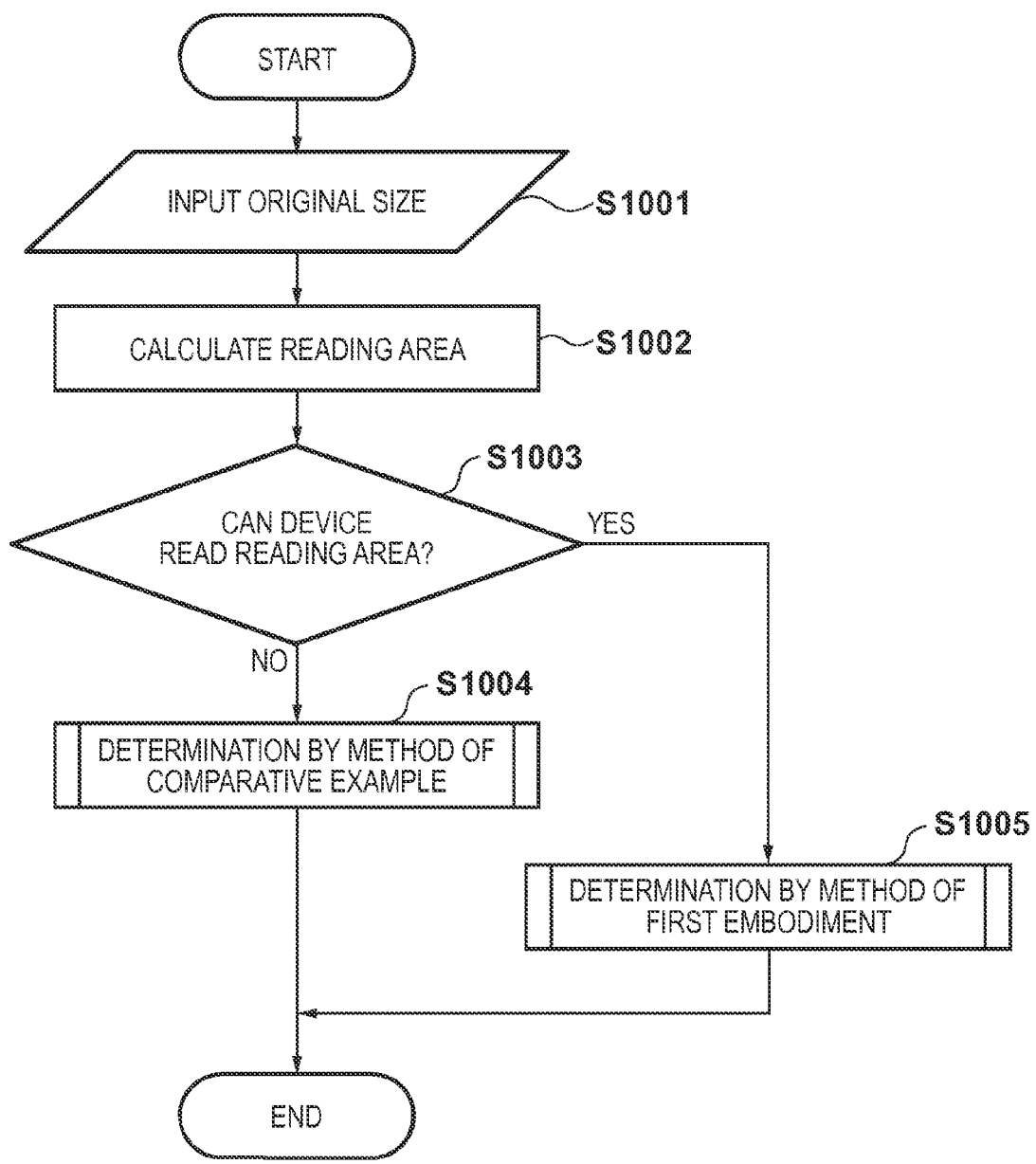
FIG. 11 is a flowchart showing an image original orientation detection process and image reading process according to the second embodiment.

FIG. 11 is a flowchart of a scanner driver program which causes an image reader 100 to perform image reading specified by a host PC 150 in accordance with the second embodiment.

In step S1001, the size of an original placed on an original platen glass is input by the user. The input method is the same as that explained in the comparative example, so an explanation thereof will be omitted.

In step S1002, a reading range is obtained from the original size specified by the user. Provided that an A5 sheet is specified, for example, the width of the reading range is set at 148+(210−148)×2=272 mm, and the length of the reading range is set at 210 mm (the long side of the original size to be read), based on 210 mm×148 mm as the dimensions of the A5 sheet.

In step S1003, whether the obtained reading area can be read by the device is confirmed. For example, the original reading width of an A4 scanner is 210 mm, but the obtained reading area width is 272 mm and hence cannot be read. If it is determined that reading is impossible, the process advances to step S1004, an image cutting direction is determined by the method according to the comparative example, and the image is cut in accordance with the determination. On the other hand, when the user has specified an L-size photograph, for example, the reading width is 165 mm as obtained in the first embodiment, so it is determined that an A4 scanner can read the image, and the process advances to step S1005. Then, an image cutting direction is determined by the method according to the first embodiment, and the image is cut in accordance with the determination.

In this embodiment explained above, therefore, the process according to the comparative example and the process according to the first embodiment are switched based on the original size specified by the user. This makes it possible to perform portrait-landscape determination by the method suited to the original size, and cut out and save the original.

[Third Embodiment]

Figure 12:
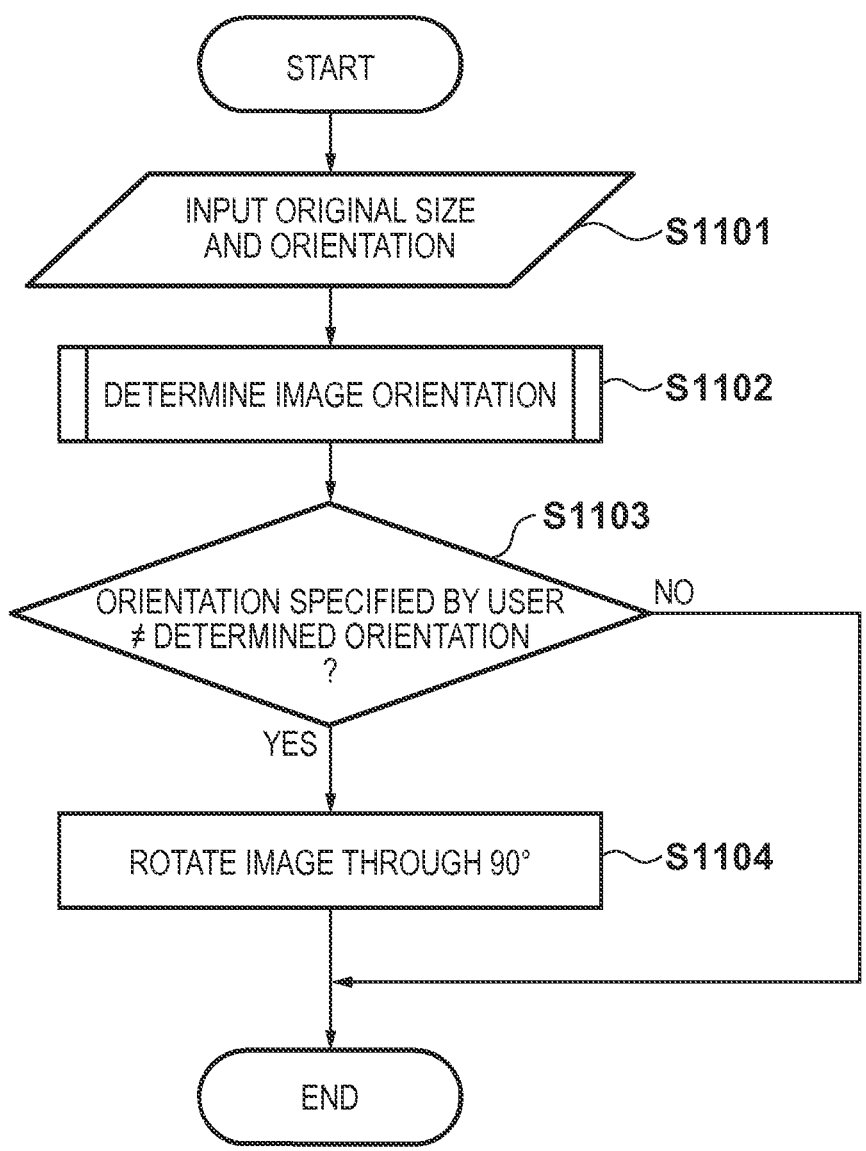
FIG. 12 is a flowchart showing an image original orientation detection process and image reading process according to the third embodiment.

FIG. 12 is a flowchart of a scanner driver program which causes an image reader 100 to perform image reading specified by a host PC 150 in accordance with the third embodiment.

In step S1101, the size and orientation of an original placed on an original platen glass are input by the user. The input method is the same as that explained in the related art, so an explanation thereof will be omitted.

In step S1102, an image is cut out by detecting the orientation of the original to be read. The specific method is the same as that described in the first or second embodiment.

In step S1103, whether the orientation input by the user and the detected orientation are the same is checked. If it is determined that the two orientations match, the image is cut out and output in accordance with the orientation. On the other hand, if it is determined that the two orientations are different, the process advances to step S1104. In step S1104, the user is notified to rotate the original through 90°.

In the embodiment explained above, therefore, even though the input process by the user is the same as that in the related art, it is still possible to accurately place an original and read an image. Also, the above embodiment has been explained by the process of the scanner driver program executed on the host apparatus side. However, the process can also be executed by a program installed in the image reading apparatus or MFP apparatus.

Note that each of the above embodiments has been explained by taking the multi-function printer apparatus (MFP apparatus) including the image reader and image printer as an example, but the present invention is not limited to this. For example, it is also possible to use an image reading apparatus (scanner apparatus) having only an image reading function. In addition, image reading control as the feature of the present invention may also be executed by a host apparatus such as a PC to which an MFP apparatus or scanner apparatus is connected, or by a controller contained in an MFP apparatus or scanner apparatus. In this case, the host apparatus or controller configures an image reading control apparatus.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-249624, filed Dec. 2, 2013, which is hereby incorporated by reference herein in its entirety.

What is claimed is:

1. An image reading control apparatus which causes an image sensor to read an image from an original placed on an original platen, comprising:
   an input unit configured to input a size of the original;
   a setting unit configured to set a reading range of the image sensor based on the size input by the input unit;
   a control unit configured to control the image sensor to read an original in the reading range set by the setting unit; and
   a comparison unit configured to compare characteristics of images in a plurality of areas in a reading area obtained by the reading,
   wherein the control unit controls the image sensor to interrupt reading of the reading range set by the setting unit in accordance with a comparison result obtained by the comparison unit;
   the image reading control apparatus further comprising a determination unit configured to determine whether to read a remaining image in accordance with the comparison result obtained by the comparison unit,
   wherein the control unit controls the image sensor to read the remaining image in a case where it is determined by the determination unit that the remaining image is to be read, and controls the image sensor to interrupt reading in a case where it is determined by the determination unit that the remaining image is not to be read.

2. The image reading control apparatus according to claim 1, wherein the control unit checks whether the reading range set by the setting unit is a range readable by the image sensor, and controls the image sensor to read the original in a case where it is determined that the reading range is the readable range.

3. The image reading control apparatus according to claim 1, wherein the input unit further inputs an orientation of the original, and
   further comprising a notification unit configured to notify a user to place the original by rotating the original in a case where the original orientation input by the input unit does not match the original orientation placed on the original platen.

4. The image reading control apparatus according to claim 1, wherein the characteristics of the images include one of a root-mean of differences between brightness values in corresponding positions of the images in the plurality of areas, each having a predetermined size, and a mean, correlation, or covariance of absolute values of the differences.

5. The image reading control apparatus according to claim 1, wherein the setting unit sets the reading range based on a long side and a short side of the original size input by the input unit.

6. The image reading control apparatus according to claim 1, further comprising a host apparatus, wherein the host apparatus includes a display unit configured to display a message concerning image reading to a user.

7. The image reading control apparatus according to claim 1, wherein the control unit controls to either read a remaining image by using the image sensor or interrupt reading the reading range set by the setting unit by using the image sensor in accordance with the comparison result of the comparison unit.

8. The image reading control apparatus according to claim 1, wherein the setting unit sets a length of a short side of the reading range to a length of a long side of the original size input by the input unit, and sets a length of a long side of the reading range to a length longer than that of the long side of the original size input by the input unit.

9. An image reading apparatus comprising:
   an image reading control apparatus comprising:
   an input unit configured to input a size of an original;
   a setting unit configured to set a reading range of an image sensor based on the size input by the input unit;
   a control unit configured to control the image sensor to read an original in the reading range set by the setting unit; and
   a comparison unit configured to compare characteristics of images in a plurality of areas in a reading area obtained by the reading, wherein the control unit controls the image sensor to interrupt reading of the reading range set by the setting unit in accordance with a comparison result obtained by the comparison unit;
   the image reading apparatus further comprising:
   an original platen;
   the image sensor;
   a moving unit configured to move the image sensor in a predetermined direction;

an operation panel configured to operate reading from the original; and a determination unit configured to determine whether to read a remaining image in accordance with the comparison result obtained by the comparison unit, wherein in a case where it is determined by the determination unit that the remaining image is to be read, the control unit controls the image sensor to read the remaining image, and in a case where it is determined by the determination unit that the remaining image is not to be read, the control unit controls the image sensor to interrupt reading.

10. The image reading apparatus according to claim 9, further comprising an original cover configured to cover the original, wherein a press platen configured to press the original is formed on a lower surface of the original cover, and upon reading the original, the image sensor reads one of the original and a surface of the press platen in accordance with the reading range set by the setting unit.

11. The image reading apparatus according to claim 10, wherein a brightness distribution of brightness values obtained by reading the surface of the press platen is uniform.

12. The image reading apparatus according to claim 9, wherein the original is placed as it is abutted against an end of the original platen, and the original is read by moving the image sensor starting from an abutting portion by the moving unit.

13. A non-transitory computer readable storage which stores a computer program to be executed by a computer for controlling image reading from an original placed on an original platen by an image sensor, the computer program comprising:

a code which executes an input process of inputting a size of the original;

a code which executes a setting process of setting a reading range of the image sensor based on the size input by the input process;

a code which executes a control process of controlling the image sensor to read an original in the reading range set by the setting process; and a code which executes a comparison process of comparing characteristics of images in a plurality of areas in a reading area obtained by the reading, wherein the control process controls the image sensor to interrupt reading of the reading range set by the setting process in accordance with a comparison result obtained in the comparison process;

the computer program stored on the non-transitory computer readable storage further comprising:

a code which executes a determination process of determining whether to read a remaining image in accordance with the comparison result obtained by the comparison process, wherein the control process controls the image sensor to read the remaining image in a case where it is determined by the determination process that the remaining image is to be read, and controls the image sensor to interrupt reading in a case where it is determined by the determination process that the remaining image is not to be read.

14. An image reading control method of an image reading control apparatus which controls an image sensor to read an image from an original placed on an original platen, comprising:

inputting a size of the original;

setting a reading range of the image sensor based on the input size;

controlling the image sensor to read an original in the set reading range; and comparing characteristics of images in a plurality of areas in a reading area obtained by the reading, wherein the controlling comprises controlling the image sensor to interrupt reading of the set reading range in accordance with the comparison result;

the image reading control method further comprising determining whether to read a remaining image in accordance with the comparison result, wherein the controlling comprises controlling the image sensor to read the remaining image in a case where it is determined that the remaining image is to be read, and comprises controlling the image sensor to interrupt reading in a case where it is determined by the determination unit that the remaining image is not to be read.

15. The method according to claim 14, wherein the controlling comprises checking whether the set reading range is a range readable by the image sensor, and controlling the image sensor to read the original in a case where it is determined that the reading range is the readable range.

16. The method according to claim 14, wherein the inputting further comprises inputting an orientation of the original, and further comprising notifying a user to place the original by rotating it in a case where the input original orientation does not match the original orientation placed on the original platen.

17. The method according to claim 14, wherein the setting comprises setting the reading range based on a long side and a short side of the input original size.

18. An image reading control method of an image reading control apparatus which controls an image sensor to read an image from an original placed on an original platen, comprising:

inputting a size of the original;

setting a reading range of the image sensor based on the input size;

controlling the image sensor to read an original in the set reading range; and comparing characteristics of images in a plurality of areas in a reading area obtained by the reading, wherein the controlling comprises controlling the image sensor to interrupt reading of the set reading range in accordance with the comparison result; and wherein the characteristics of the images include one of a root-mean of differences between brightness values in corresponding positions of the images in the plurality of areas, each having a predetermined size, and a mean, correlation, or covariance of absolute values of the differences.

* * * * *